Nov. 14, 1944.   F. C. FAHNESTOCK   2,362,621
CONVERSION OF HYDROCARBONS
Filed Sept. 2, 1942
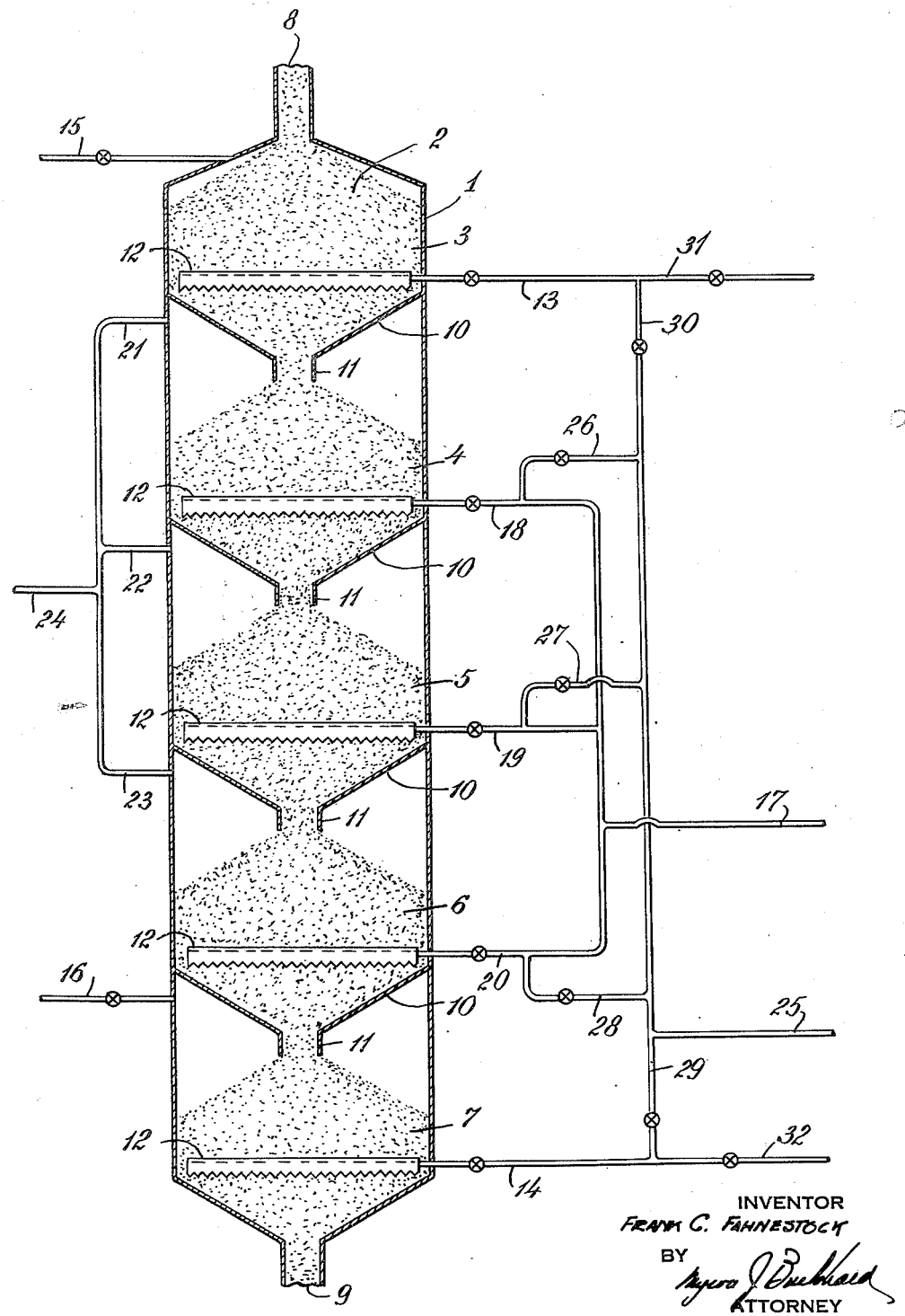
INVENTOR
FRANK C. FAHNESTOCK
BY
ATTORNEY Patented Nov. 14, 1944

2,362,621

UNITED STATES PATENT OFFICE 2,362,621

CONVERSION OF HYDROCARBONS

Frank C. Fahnestock, Wenonah, N. J., assignor to Socony-Vacuum Oil Company, Incorporated, a corporation of New York Application September 2, 1942, Serial No. 457,014

4 Claims. (Cl. 196—52)

This invention has to do with the conversion of hydrocarbons and other organic compounds in the presence of contact masses, and is particularly concerned with such processes wherein the contact mass in particle form flows continuously through a zone wherein it is brought into contact with the reactants. It is well known that heavy hydrocarbons of the nature of gas oil boiling in the range between about 500° F. and about 750° F. when heated to temperatures of the order of 800° F. and above, and in the vapor form are contacted with catalytic materials, such as associations of alumina and silica, that a substantial conversion to hydrocarbons of gasoline boiling point takes place. Such processes are entering into wide commercial use at present. In the most usual form of this process, the contact mass is alternately subjected in situ to reaction and regeneration. A recently adopted form of this general type of process provides for the continuous movement of the contact mass in cyclic flow through a reaction zone and then through a regenerating zone from which it is returned to the reaction zone.

Other reactions of the same nature, and which may be conducted in the same manner, are alkylation, dealkylation, hydrogenation, reforming, isomerization, synthesis of organic materials by reaction of two or more components in the vapor state, cyclization, oxidation, and the like. While the discussion is limited to hydrocarbon conversion, this is for purposes of example only, and does not effect a limitation upon the scope of the process claimed.

This invention is specifically directed to that form of a general process in which the contact mass flows continuously through the reaction zone.

In such processes, the activity of the contact mass varies progressively from the entry end of the reaction zone to the exit end of the reaction zone. One of the reasons for such variation is undoubtedly the progressive collection by the contact mass of carbonaceous impurities resulting from the conversion being effected therein. Another probable reason is that the conversion reactions are usually somewhat endothermic and while the contact mass enters at elevated temperature, upon its return from regeneration, and the vapors are introduced at reaction temperatures, frequently a notable decrease in temperature between entry and exit of contact mass in the reactor may be noticed. These variations in activity have given rise to certain difficulties in securing the most efficient utilization of all portions of the flowing contact mass.

This invention has for its principal object the provision of a novel means for securing a more adequate and useful utilization of the various portions of the contact mass in its passage through the reaction zone.

The invention may be readily understood by referring to the drawing attached hereto, the single figure of which shows in highly diagrammatic form, a typical apparatus useful in following out my invention.

In this drawing, 1 denotes a catalytic reactor in which a continuous solid column of particle form contact mass 2 descends serially through a series of stages designated as 3, 4, 5, 6 and 7, the contact mass entering the reactor at inlet 8 and departing therefrom at exit 9. Each of the stages within the reactor is isolated from the next adjoining stages by a funnel-shaped partition 10 having a depending throat 11 through which the contact material may flow under control of a proper rate determining means not shown, acting upon an outflow from exit 9. In each stage near the bottom thereof there is a vapor distributor 12 which may conveniently take the shape of a gabled trough and may, if desired, have serrated bottom edges to insure proper distribution of vapors throughout the superimposed contact mass. The end sections 3 and 7 usually will be the purging sections, the first one to purge the contact mass of air before contacting with hydrocarbon reactants, and the last to purge the contact mass of hydrocarbon reactants prior to regeneration. In these sections 3 and 7, purging medium will be supplied to the distributor and trough 12 by lines 13 and 14 respectively. The purging medium will be withdrawn from each of these chambers by pipes 15 and 16 respectively. The remaining stages, namely, 4, 5 and 6, are reaction stages. Three such stages are shown here for purposes of illustration. The exact number of stages to be used will be determined by the nature of the reaction being carried out and the extent to which the isolation of the reaction into several portions may be desired. In any event, hydrocarbon reactants introduced to the system through pipe 17 are divided into several portions and passed in parallel through the several stages 4, 5 and 6 by pipes 18, 19 and 20, respectively, the products of each stage being withdrawn by pipes 21, 22 and 23 to be finally withdrawn from the system through pipe 24. In each stage, that is in each of chambers 4, 5 and 6, the depth of the catalyst bed above the vapor distributor 12 is the same. Remembering that the activity of the catalyst is different in each of the chambers 4, 5 and 6, obviously parallel exposure of similar amounts of hydrocarbons in the several chambers will give different results. Under such circumstances, it is possible to secure wholly erratic cracking results and wholly erratic depositions of carbonaceous impurities in the several chambers. In order to avoid this, I have taken advantage of the principle that decrease of reaction obtained in any exposure of hydrocarbon vapors to a contact mass is a function of the partial pressure of those hydrocarbon vapors at the moment of exposure. Accordingly, I have provided a pipe 25 provided with branches 26, 27 and 28 leading, respectively, to pipes 18, 19 and 20 and by supplying a proper gasiform fluid material inert to the reaction being conducted, such as, for example, steam, light hydrocarbons or similar inert material I may feed to each of the reaction stages a blend of hydrocarbons and inert materials so adjusted that the partial pressure of a hydrocarbon material in each conversion stage is properly adjusted to the relative activity of the contact mass material which it will meet therein.

This partial pressure normally will be increased with the decreasing activity of the contact mass. If steam is to be used as a partial pressure medium, it is convenient to extend pipe 25 by connections 29 and 30 to provide purging medium for the respective purging chambers. If light hydrocarbons are to be used as partial pressure media, and it is desirable to use steam for purging that steam may be supplied by pipes 31 and 32.

The amount of diluent vapor to be utilized as a partial pressure medium will vary both with the activity and nature of the particular catalytic contact mass material being used and with the nature of the partial pressure material itself. It will also vary considerably in view of the type of conversion being carried out; for example, it would be different in a cracking conversion wherein gas oil was converted to gasoline than it would be in a reforming operation wherein a heavy naphtha was being altered in anti-knocking properties. In cracking of gas oil to gasoline the amount of partial presure material will normally vary within the range of from 0% to 30% by weight of the reacting vapor, when steam is used as the diluent. Under the same conditions, if light hydrocarbons are used as diluents, the amounts will range from 0% to about 50% by weight. One particular and outstanding advantage of this form of operation lies in the fact that it is particularly capable of control of the reaction in those first stages of the reactor wherein the catalytic contact mass has a relatively high activity and in which stages it is normally difficult to so control the conversion as to avoid excessive deposits of carbonaceous residue upon the contact mass while at the same time attaining useful conversions of the charged material.

I claim:

1. That method for the conversion of hydrocarbons and the like in the presence of a contact mass which comprises the steps of cyclically moving a flowing stream of particle form contact mass serially through a plurality of reaction stages without intervening regeneration, then through a regeneration operation and returning it to the reaction, the conversion activity of the contact mass decreasing in successive reaction stages, passing a stream of reactants at conversion temperature through each stage, introducing inert gasiform material to the reactants entering certain of the stages, and proportioning the reactants and inert material to provide separate feed streams with progressively decreasing partial pressure of reactants for contact with the several stages of contact mass of progressively increasing activity.

2. That method for the conversion of hydrocarbons in the presence of a contact mass which comprises the steps of cyclically moving a flowing stream of particle form contact mass serially through a plurality of reaction stages without intervening regeneration, then through a regeneration operation and returning it to the reaction, the conversion activity of the contact mass decreasing in successive reaction stages, passing a stream of hydrocarbon reactants at conversion temperature through each stage, introducing steam to the hydrocarbons entering certain of the stages, and proportioning the hydrocarbons and steam to provide separate feed streams with progressively decreasing partial pressure of hydrocarbons for contact with the several stages of contact mass of progressively increasing activity.

3. That method for the conversion of hydrocarbons in the presence of a contact mass which comprises the steps of cyclically moving a flowing stream of particle form contact mass serially through a plurality of reaction stages without intervening regeneration, then through a regeneration operation and returning it to the reaction, the conversion activity of the contact mass decreasing in successive reaction stages, passing a stream comprising hydrocarbon reactants at conversion temperature through each stage, introducing inert gaseous material into the hydrocarbon vapors in each reaction stage except the last one in the direction of contact mass flow, the amount of inert material so introduced being greater in each reaction stage than in the stage next succeeding in the direction of contact mass flow.

4. That method for the conversion of hydrocarbons in the presence of a contact mass which comprises the steps of cyclically moving a flowing stream of particle form contact mass serially through a plurality of reaction stages without intervening regeneration, then through a regeneration operation and returning it to the reaction, the conversion activity of the contact mass decreasing in successive reaction stages, passing a stream comprising hydrocarbon reactants at conversion temperature through each stage, introducing steam into the hydrocarbon vapors in each reaction stage except the last one in the direction of contact mass flow, the amount of steam so introduced being greater in each reaction stage than in the stage next succeeding in the direction of contact mass flow.

FRANK C. FAHNESTOCK.